UNITED STATES PATENT OFFICE.

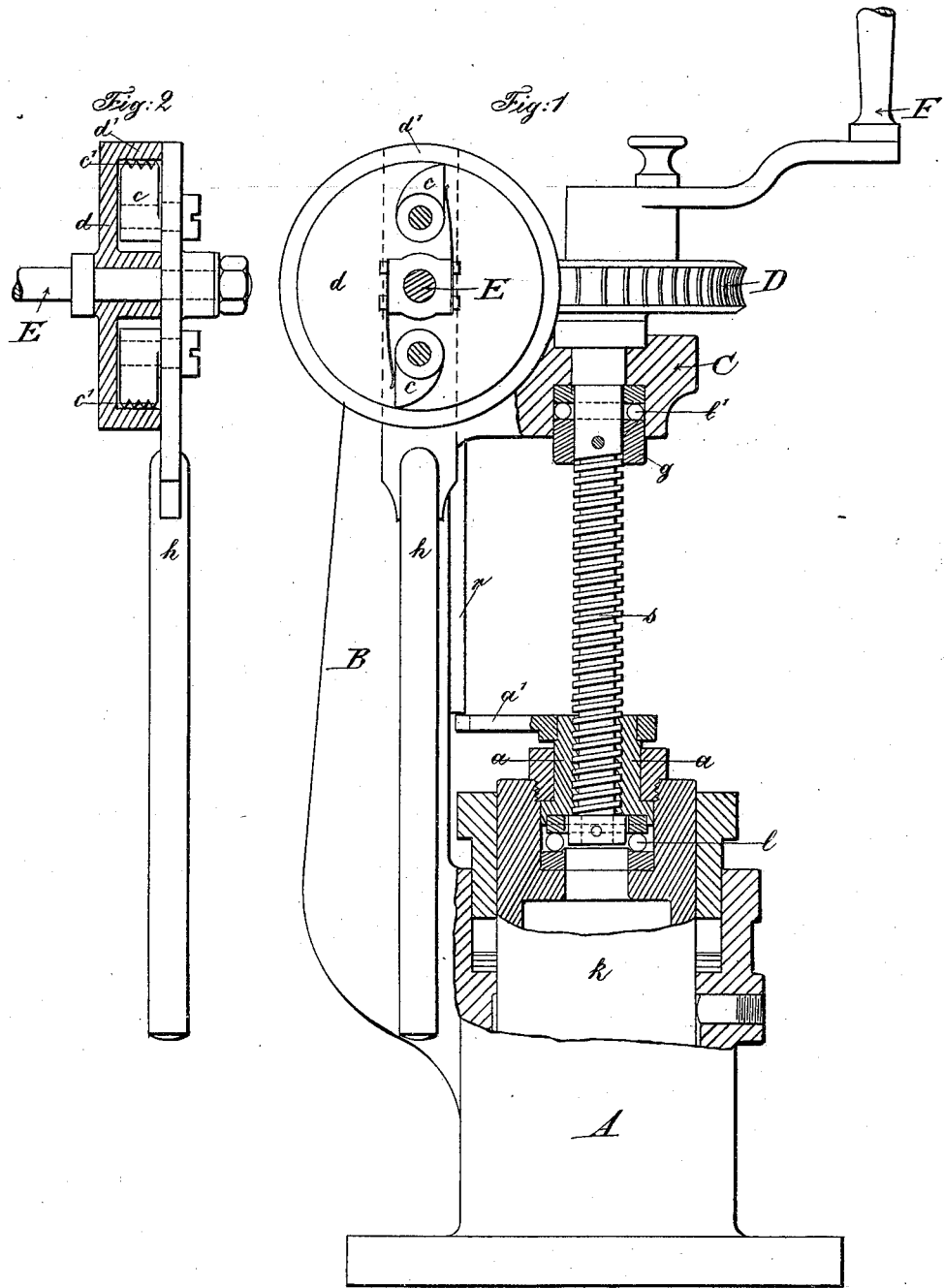

WILHELM MICHALK, OF DEUBEN, GERMANY.

LUBRICATOR.

SPECIFICATION forming part of Letters Patent No. 604,409, dated May 24, 1898.

Application filed November 9, 1896. Serial No. 611,512. (No model.)

*To all whom it may concern:*

Be it known that I, WILHELM MICHALK, a subject of the King of Saxony, residing at Deuben, near Dresden, in the Kingdom of Saxony, German Empire, have invented a new and useful Improved Lubricator, of which the following is a specification.

This invention relates to that class of lubricators, sometimes called "lubricating-presses," wherein the lubricant is located within a cylinder and is forced gradually outwardly therefrom by means of an automatically-driven piston; and the present invention consists in an improved construction by means of which the reciprocating movement of the piston is automatically stopped when it reaches the limit of its working stroke.

In the accompanying drawings this improvement is shown applied to a lubricator represented in Figure 1 partly in section and partly in elevation, Fig. 2 showing a detail of construction.

A is the cylinder of the lubricator, and $k$ is the piston thereof.

B is the pump-frame, connected with the cylinder A and having an arm C overhanging said cylinder. The piston $k$ is operated by a screw-spindle $s$, journaled in the arm C and having no longitudinal, but only a rotary, movement therein. The spindle $s$ has a gear D, through which rotary movement is imparted to the spindle in proper direction to depress the piston $k$. This gear D may be rotated in any suitable manner. A convenient way is by a worm (not shown) on the shaft E, which is rotated by the lever $h$, as hereinafter explained. The spindle $s$ is rotated in the reverse direction to elevate the piston $k$ by the crank-handle F.

For automatically disconnecting the piston the following arrangement is used: The nut of the screw-spindle $s$, which drives the piston $k$, is not fixed to the piston $k$, as is usual, nor is the female thread cut into the piston, but a separate nut $a$ is provided in the piston $k$, so as to be free to rotate. In order to guide the piston in a straight direction, an arm $a'$ is provided on the nut $a$, the forked portion of which engages with a rib $r$ on the pump-frame and is guided by this rib when the piston descends. By reason of this arrangement the nut $a$ can only move in a straight line, while the arm $a'$ is guided on the rib $r$. The length of the guide-rib $r$ is so chosen that the arm $a'$ will cease to be in contact therewith and be no longer guided thereby when the piston $k$ has reached the lowest point of its stroke, as shown in Fig. 1. From that moment the nut $a$ can participate in the rotary motion of the screw-spindle $s$ without transferring the same to the piston $k$. From that moment, therefore, the piston has neither a rectilinear motion, nor does rotary motion take the place thereof. The latter being obviated, neither the piston nor the packing of the same suffer by wear after the lubricator has ceased to be operative.

In cases where a high pressure acts on the piston from the part to be lubricated—for instance, in steam-engines working with steam under high pressure—this pressure becomes perceptible at the surface where the piston $k$ touches the nut $a$ and also where the collar $g$ on spindle $s$ touches the bearing of the latter, and this produces considerable friction at these two points. In order to prevent, on the one hand, the nut $a$ becoming unable to turn in the piston $k$ and forcing the latter to turn with it when it should be stationary and, on the other hand, to avoid excessive expenditure of power in overcoming such friction and the consequent wear of the working parts that transmit motion, which would injure the same, ball-bearings $l$ and $l'$, respectively, are provided between the piston $k$ and nut $a$, as well as between collar $g$ and the bearing of spindle $s$. (See Fig. 1.)

The improvement in the controlling mechanism of the lubricator is shown in Figs. 1 and 2 of the drawings. It relates to the pawls $c$, provided on the lever $h$, which coöperate with the disk $d$, fast to the shaft $e$, and consists, substantially, in providing the pawls $c$ with several acute-angled teeth $c'$, by which they engage with the plain inner side of the rim $d'$ of disk $d$, actuating the latter when lever $h$ swings forward. These teeth, as soon as lever $h$ moves forward, are forced into the rim $d'$ of disk $d$, and consequently the latter is also forthwith set in motion. By reason of this arrangement the loss of motion which takes place with both toothed gear and friction-gear is entirely avoided, and hence the controlling-lever $h$, without losing any of its motion, acts to operate the rest of the mechanism and therefore the piston. It follows that the smallest amount of motion can be given to said lever, and thus the lubricant may be fed to the part to be lubricated in the smallest particles.

Having now particularly described and ascertained the nature of my invention and in what manner the same is to be performed, I declare that what I claim is—

In lubricating apparatus, the combination of the pump-frame having a rib $r$, the piston $k$, and the nut $a$, arranged so as to be able to rotate in the piston $k$, said nut having an arm $a'$, which engages the rib $r$, so that said nut is constrained to travel in a straight line axially so as to operate the piston, said arm, when the piston reaches the lower portion of its stroke, becoming disengaged from said rib $r$, thereby permitting the nut to rotate in the piston, thereby allowing the piston to remain at rest, substantially as set forth.

In testimony whereof I have signed this specification in the presence of two subscribing witnesses.

WILHELM MICHALK.

Witnesses:
HERNANDO DE SOTO,
C. F. ROSENCRANTZ.